(12) United States Patent
Wootten

(10) Patent No.: US 8,375,801 B2
(45) Date of Patent: Feb. 19, 2013

(54) SENSITIVE DIFFERENTIAL PRESSURE SENSOR AND METHOD

(75) Inventor: Keith Robert Wootten, Reading (GB)

(73) Assignee: Sondex Limited, Yately, Hampshire (GB)

( * ) Notice: Subject to any disclaimer, the term of this patent is extended or adjusted under 35 U.S.C. 154(b) by 240 days.

(21) Appl. No.: 12/972,689

(22) Filed: Dec. 20, 2010

(65) Prior Publication Data

US 2012/0152027 A1 Jun. 21, 2012

(51) Int. Cl.
*G01L 9/00* (2006.01)
(52) U.S. Cl. .............................. 73/745; 73/744
(58) Field of Classification Search ............... None
See application file for complete search history.

(56) References Cited

U.S. PATENT DOCUMENTS

| 4,181,835 | A | * | 1/1980 | Stadler et al. | 200/82 E |
|---|---|---|---|---|---|
| 4,608,870 | A | * | 9/1986 | Huber et al. | 73/708 |
| 4,680,436 | A | * | 7/1987 | Brausfeld et al. | 200/82 E |
| 4,754,648 | A | * | 7/1988 | Byrd et al. | 73/744 |
| 4,755,636 | A | * | 7/1988 | Akio | 200/82 E |
| 5,429,000 | A |   | 7/1995 | Raj et al. |   |
| 5,490,425 | A |   | 2/1996 | Raj et al. |   |
| 5,542,293 | A | * | 8/1996 | Tsuda et al. | 73/146.5 |
| 5,602,373 | A | * | 2/1997 | Sauer et al. | 200/82 E |
| 6,333,689 | B1 | * | 12/2001 | Young | 340/506 |
| 7,250,753 | B2 | * | 7/2007 | Terasaki | 324/207.24 |
| 7,387,080 | B2 | * | 6/2008 | Andronic | 116/267 |
| 2007/0151503 | A1 |   | 7/2007 | Andronic |   |

FOREIGN PATENT DOCUMENTS

EP 1 435 515 A2 7/2004
JP 2-157627 A 6/1990

OTHER PUBLICATIONS

EP Search Report mailed on Mar. 16, 2012 and issued in related application No. EP 11 19 3210.

* cited by examiner

*Primary Examiner* — Lisa Caputo
*Assistant Examiner* — Jermaine Jenkins
(74) *Attorney, Agent, or Firm* — Potomac Patent Group PLLC

(57) ABSTRACT

A differential pressure sensor has a magnetized piston free to move in a cylinder. Magnetic endcaps seal the ends of the cylinder, forming chambers on either side of the piston. The moveable magnetic piston is constrained by the opposing magnetic fields of the endcaps. The piston is covered with magnetic ferrofluid, providing a low friction gas-tight seal around the piston. The cylinder has two pressure input lines, one being connected to the chamber on either side of the piston. The relative pressures of the input lines cause the piston to move to a position of equilibrium within the cylinder, with the magnetic fields of the endcaps holding the piston in place against the pressure. A magnetic field angle sensor detects flux lines on the outside of the cylinder, and the reading is correlated with the pressure differential between the two input lines.

20 Claims, 7 Drawing Sheets

SENSITIVE DIFFERENTIAL PRESSURE SENSOR AND METHOD

BACKGROUND

Various embodiments of the present invention relate to sensors and measurement devices, and more specifically, to pressure sensors.

There are a number of different pressure related parameters that can be measured. An absolute pressure sensor measures pressure relative to perfect vacuum pressure of 0 pounds per square inch (PSI) or zero pressure. Atmospheric pressure is 101.325 kPa (14.7 PSI) at sea level with reference to vacuum. The pressure measurement taken on a car tire is sometimes called gauge pressure. A gauge pressure sensor measures the pressure relative to a given atmospheric pressure at the location of the measurement. For example, when the tire pressure gauge reads 0 PSI, there is actually around 14.7 PSI (or atmospheric pressure) in the tire. A third type of pressure measurement is differential pressure. A differential pressure sensor measures the difference between two pressure inputs to the sensing device. For example, a differential pressure sensor could be used to measure the pressure increase across an oil pipeline pump.

There are several conventional designs for pressure sensors operating on the basis of a number of different technologies. Piezoresistive strain gauge pressure sensors exploit the piezoresistive effect to detect strain due to pressure applied to a bonded strain gauge. A piezoelectric pressure sensor uses the piezoelectric effect of materials such as quartz to measure pressure induced strain. A capacitive pressure sensor has a diaphragm and pressure cavity designed to create a variable capacitor for detecting strain due to applied pressure. Electromagnetic pressure sensors measure the displacement of a diaphragm by exploiting changes in inductance, the Hall Effect, the eddy current principal, or using a Linear Variable Differential Transformer (LVDT).

However, such conventional pressure sensing technologies are not well suited to measuring low differential pressures, are expensive, and may be difficult to operate in a environments which require high withstand pressures. Accordingly, a robust, compact pressure sensor suitable for measuring low differential pressures is needed.

SUMMARY

Various embodiments disclosed herein involve a differential pressure sensor that has a hollow cylinder with magnetic endcaps sealing off each end. The cylinder contains a piston which also has a magnet. The piston is arranged such that its south pole faces the south pole of one endcap, and its north pole faces the north pole of the other endcap. The various embodiments feature a magnetic ferrofluid coating around the piston to provide a seal between the piston and said cylinder. The cylinder has a first pressure line input feeding into a first chamber of the cylinder formed between the piston and one of the endcaps. A second pressure line feeds into a second chamber of the cylinder between the piston and the other endcap. A magnetic flux angle sensor is positioned outside the cylinder to detect magnetic flux lines from the piston, thus determining its position. Based on the position of the piston, a calculating means develops a differential pressure reading between the two input lines.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1A:
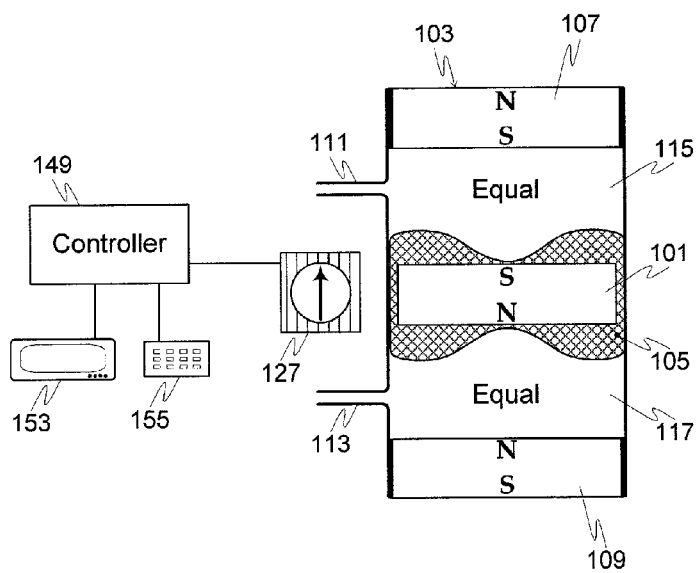
FIGS. 1A-C depict a cross-sectional view of a differential pressure sensor according to various embodiments of the present invention.
Figure 1B:
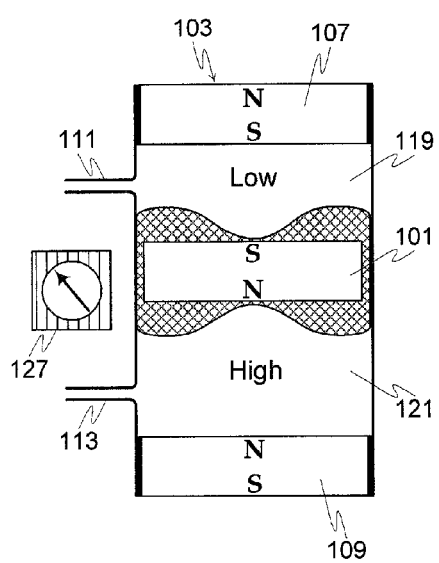
Figure 1C:
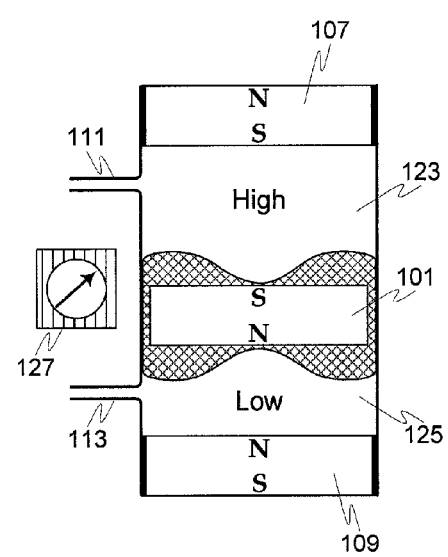

FIGS. 1A-C depict a cross-sectional view of a differential pressure sensor 100 according to embodiments of the present invention. Various embodiments disclosed herein involve a differential pressure transducer that uses one or more permanently magnetized moving pistons contained within a cylinder and fixed magnets sealed into the ends of the cylinder. The cylinder may be made of a material with low magnetic permeability that is transparent to magnetic flux lines, yet able to withstand the pressures being measured. The moveable piston 101 is sealed into cylinder 103 using a ferrofluid 105 which provides a very low friction gas-tight seal. Piston 101 is configured to include a magnet. The piston 101 is constrained axially by opposing magnetic fields from fixed magnets in the two magnetic endcaps, 107 and 109, positioned at both ends of cylinder 103. The magnetic poles of magnetic endcap 107 and 109 are configured to be the same polarity as the respective adjacent magnetic poles of piston 101, thus repelling each other. As shown in FIGS. 1A-C, the south pole of magnetic endcap 107 faces the south pole of piston 101 magnet, and the north pole of magnetic endcap 109 faces the north pole of piston 101 magnet. In this way, the piston 101 is repelled from the magnetic endcaps 107 and 109 that oppose it from either end.

Conventional pressure sensing devices typically rely on a position sensor that breaches the walls of the pressure chambers. However, since the various embodiments disclosed herein use magnetic field position sensing, the walls of cylinder 103 can be configured to be quite thick, able to withstand very high absolute pressures. Furthermore, the use of magnetic fields to constrain the piston 101 provides a non-linear output, giving the device a relatively large dynamic range over which pressure differentials can be detected. The differential pressure sensor 100 tends to have the greatest sensitivity at lower pressure differentials, which is an advantage in certain circumstances.

The cylinder 103 is configured to have two pressure inputs 111 and 113. The differential pressure sensor 100 measures the difference between the pressure in input 111 and input 113. When each of the two inputs 111 and 113 provide equal pressure in chambers 115 and 117 above and below the piston, then piston 101 will remain in its nominally central position as shown in FIG. 1A. Although the figures depict pressure chambers 115 and 117 of equal size, in some embodiments the pressure chambers may be designed to contain different volumes. This can be useful, for example, in order to tailor the desired sensitivity of the sensor system 100 to a range of expected pressures inputs from input lines 111 and 113. Turning back to FIGS. 1A-C, if the inputs 111 and 113 differ, then pressure above and below piston 101 from the inputs 111 and 113 acts to displace piston 101 from a nominally central position. FIG. 1B depicts input 113 having a relatively higher pressure than input 111, thus driving piston 101 up, away from magnetic endcap 109 towards magnetic endcap 107. In FIG. 1B the pressure in chamber 121 exceeds the pressure in chamber 119. In FIG. 1C the input 113 has a lower pressure than input 111, thus piston 101 is pulled downward, towards magnetic endcap 109 and away from magnetic endcap 107. In FIG. 1C the pressure in chamber 125 is lower than the pressure in chamber 123.

The piston 101 of pressure sensor system 100 may be either be made of a magnetic material, or may be configured to hold a magnet. In either case the piston 101 has a magnet that moves in response to pressure changes between the two inputs 111 and 113. The moving magnet's external field allows the position of piston 101 to be detected using one or more magnetic field angle sensors 127 positioned outside the cylinder 103. The field angle sensor 127 is typically positioned close enough to the outside of cylinder 103 to accurately resolve the position of the fixed magnet in moveable piston 101. The sensor 127 may be implemented with any of several types of magnetic flux field angle sensors, including for example, a tunnelling magneto resistance (TMR) sensor, a giant magnetoresistance (GMR) sensor, anisotropic magneto resistance (AMR), Hall Effect devices, or other like types of magnetic field angle sensors known to those of ordinary skill in the art. The TMR sensors are capable of providing a large signal output of several hundred millivolts, and have two outputs, one proportional to the sine and the other to the cosine of the incident magnetic flux angle. TMR sensors are sensitive devices, and work in magnetic saturation so that the absolute magnitude of flux is immaterial above some small minimum value. As the pressure difference between the two inputs 111 and 113 changes the position of piston 101 within cylinder 103 also changes. This, in turn, alters the measured angle of the magnetic field flux lines. The effect on the magnetic field flux lines is detected by the magnetic field angle sensor 227. This may be more clearly seen in FIGS. 2A-C.

In various embodiments the angle sensor 127 outputs are connected to a microprocessor or other controller to provide a digital output, calibration factors, and the gravitational adjustment calculations. (The gravitational adjustment calculations are described below in conjunction with FIGS. 3A-C). Turning to FIG. 1A, magnetic field angle sensor 127 is connected to a controller 149 or other calculating means which correlates the magnetic flux angle to the position of the piston 101 and calculates the pressure differential between two pressure inputs 111 and 113. In various embodiments the controller 149, or other calculating means, may be embodied as a microprocessor, control logic, circuitry, a computer, or other electronic device capable of being programmed to carry out instructions or routines. The controller 149 may contain, or have access to, memory or storage devices suitable for storing data, software instructions or routines for performing calculations related to magnetic flux angles, piston position, and pressure readings. The pressure sensor system 100 also has a display 153 and user input device 155 connected to the controller 149. The display 153 may be embodied as an LCD or LED display, a computer screen, or other like type of display device suitable for visually conveying information such as the pressure readings and control codes for the system 100. The user input device 155 may be embodied as a keypad, keyboard, buttons, computer mouse, or other like type of user input device.

Ferrofluid material 105 is a liquid which is attracted to magnets. The ferrofluid material 105 surrounding piston 101 provides a gas-tight seal with very low friction. Ferrofluid is a commercially available liquid comprising nanoscopic magnetic particles in suspension. Ferrofluids can be obtained from a number of sources, including Ferrofluidics Corporation of Nashua, N.H.; Ferrotec Corporation of Bedford, N.H.; 3M Specialty Chemicals Division, St. Paul, Minn.; and Liquids research Ltd of Bangor, Wales, United Kingdom. In various embodiments the type of ferrofluid is selected so that the fluid coming in contact with the ferrofluid seal 105 is immiscible with the ferrofluid, and does not react chemically with the ferrofluid. The magnet 101 prevents the ferrofluid 105 from floating away. In some implementations a kerosene-based ferrofluid has been used. Other ferrofluids of composed of differing materials may be used, depending upon the properties of the liquid undergoing pressure measurement. If the differential pressure sensor 100 is used for pressure measurements of an aggressive medium, a silicone oil barrier may be employed to keep the aggressive fluids away from bleeding through to the low pressure chamber. This piston magnet 101 is coated with ferrofluid 105 which produces a low friction seal between piston 101 and the walls of cylinder 103 as the piston moves up and down in response to pressure inputs 111 and 113. The magnetic angle sensor 127 detects the resulting field angle of the magnetic flux from the three magnets, that is, from the magnet of the piston 101 and the magnetic endcaps 107 and 109.

Figure 2A:
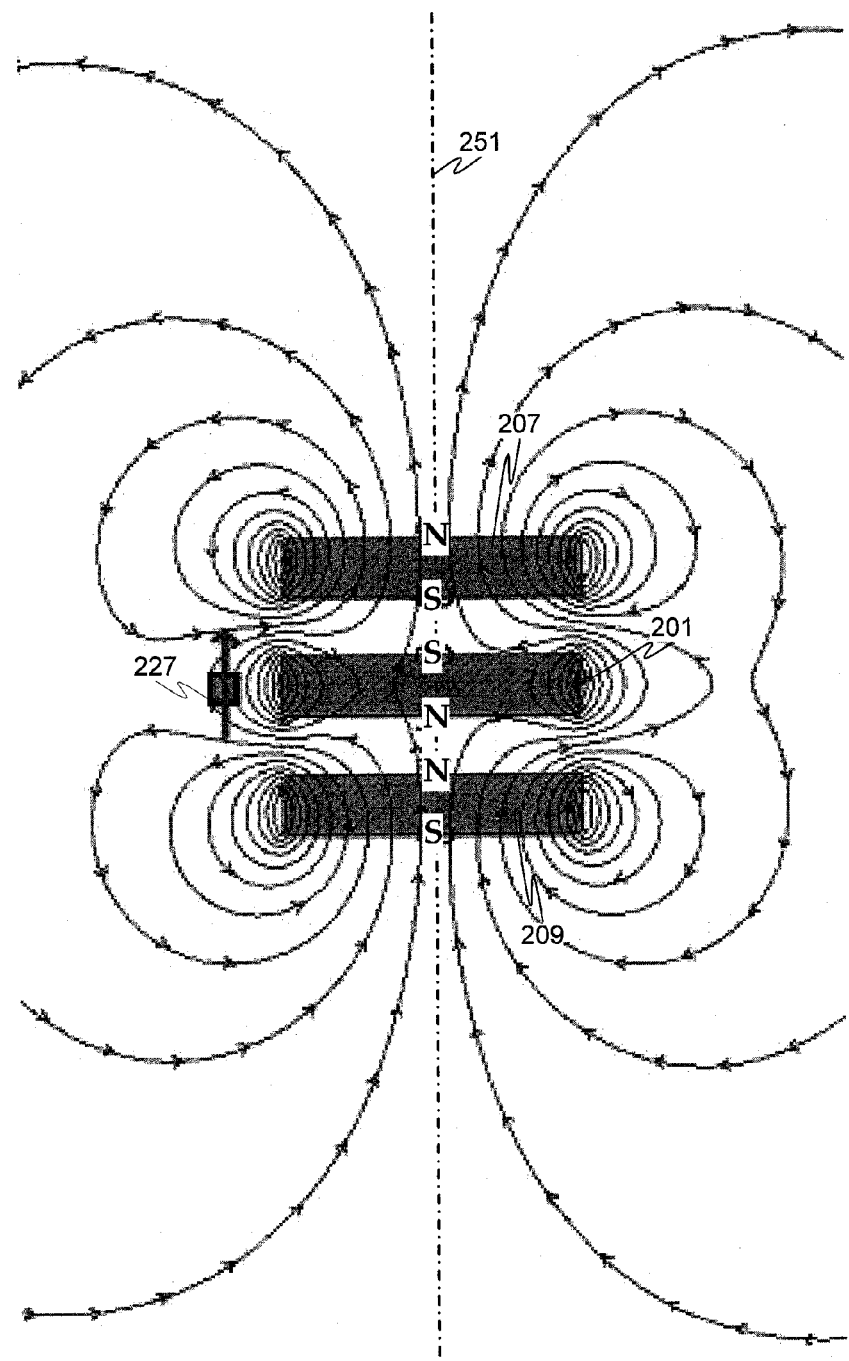
FIGS. 2A-C depict flux diagrams for the three positions of the piston shown in FIGS. 1A-C.
Figure 2B:
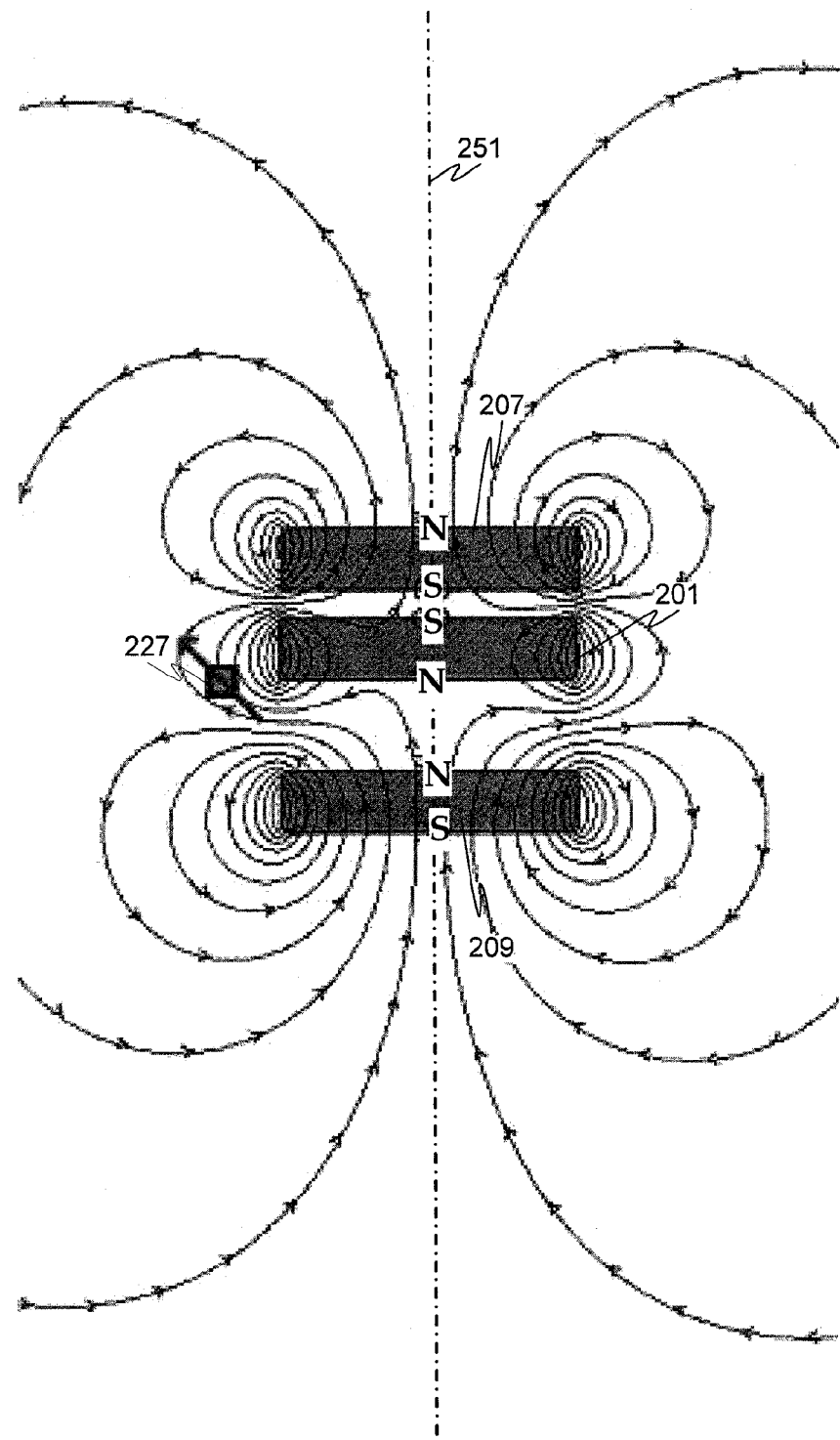
Figure 2C:
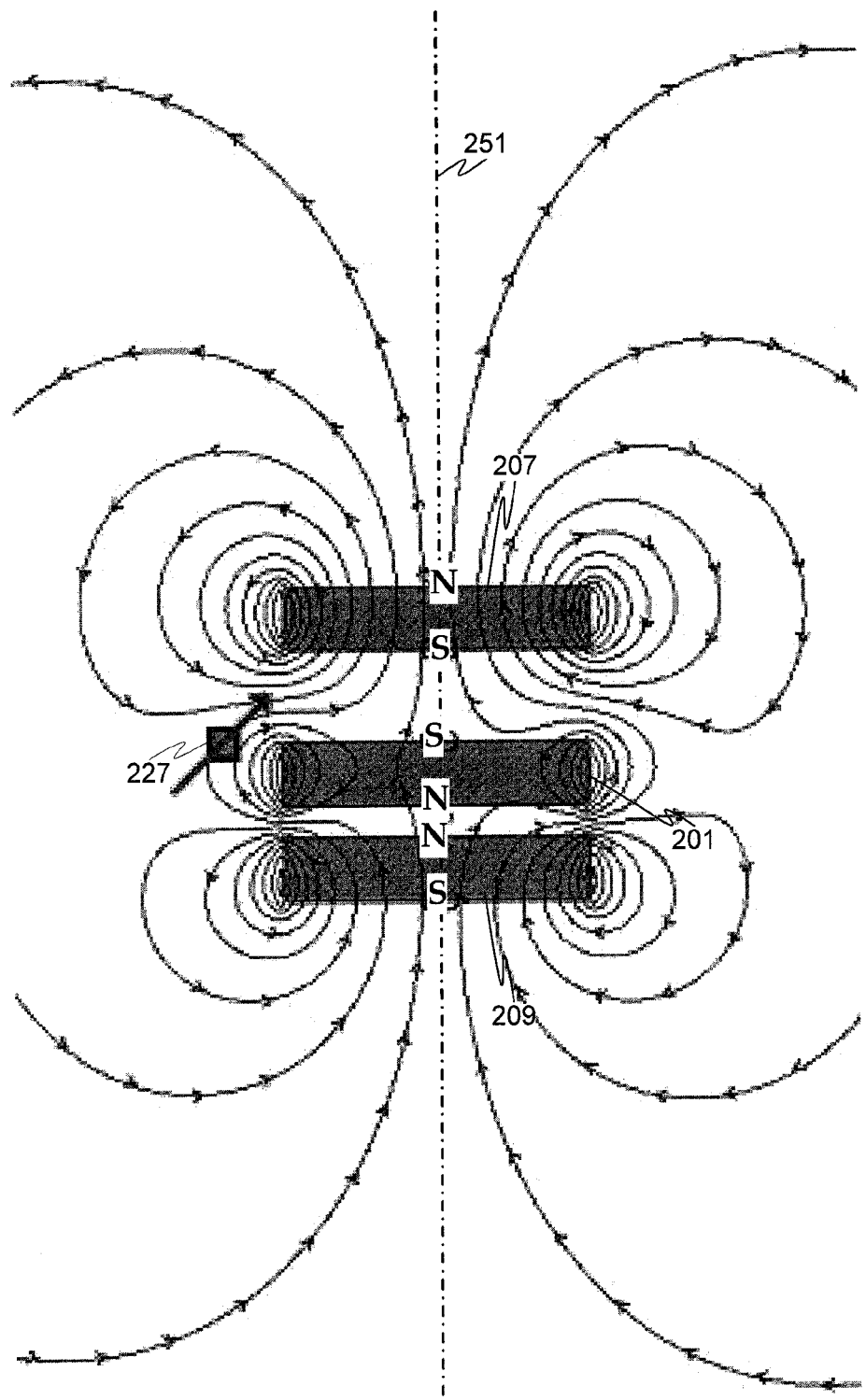

FIGS. 2A-C depict flux diagrams for the three positions of the piston shown in FIGS. 1A-C. In FIG. 2A the piston magnet 201 is located midway between the two fixed magnets 207 and 209 of the magnetic endcaps, causing the flux lines to be symmetrical about both axes in this configuration. It should be noted that the shape of the flux lines depends not only upon the distance between the magnets, but also upon a number of other factors and parameters of the design. For example, the shape of the magnets and the strength of the magnets are both parameters that affect the magnetic flux lines. In some implementations magnets of different shapes, and/or different strengths may be used, depending upon the design requirements of the system and the component features and constraints.

In the implementation and piston position depicted in FIG. 2A the flux lines at the sensor are substantially parallel to the central axis 251 of the cylinder. Therefore the magnetic field angle sensor 227 reads 0 degrees, which correlates to an equal pressure being received in the two inputs. In FIG. 2B the relative pressures of the two inputs has changed, causing piston magnet 201 to move to a position closer to fixed magnet 207 than fixed magnet 209. This change of position causes a change in the magnetic flux lines which is detected by the sensor 227. In the implementation and piston position depicted in FIG. 2B the magnetic field angle sensor 227 reads approximately 315 degrees (or negative 45 degrees). The system is able to correlate the 315 degree reading to a particular pressure differential between the two input pressures. The two pressures may be calculated based on the position of the piston which determines the volume of the two pressure chambers within the cylinder. Turning to FIG. 2C, the two input pressures have again been changed, causing the piston magnet 201 to move to a position closer to fixed magnet 209 and farther away from fixed magnet 207. In the implementation and piston position of FIG. 2C the magnetic field angle sensor 227 reads approximately 45 degrees. Once again the system will be able to correlate the 45 degree reading to a particular pressure differential between the two input pressures.

Figure 3A:
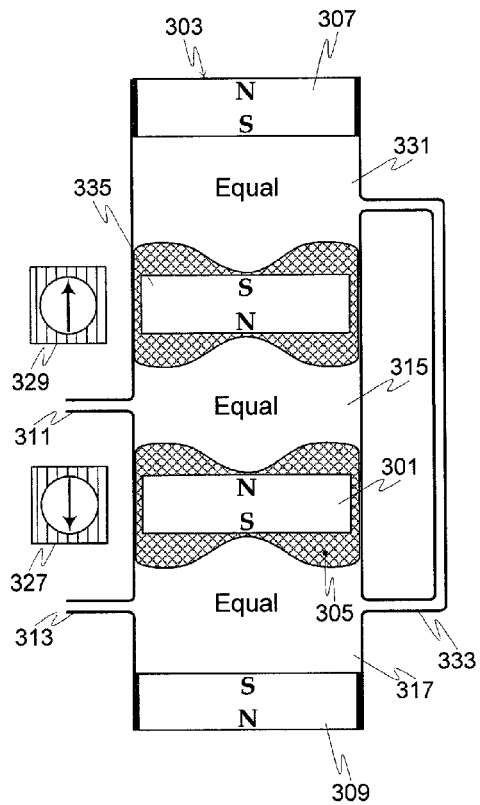
FIGS. 3A-C depict a cross-sectional view of a gravity compensated pressure sensor according to various embodiments of the present invention.
Figure 3B:
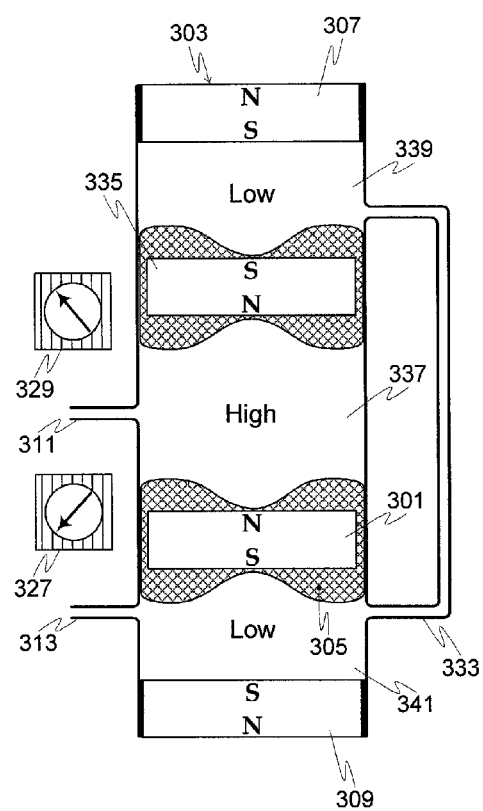
Figure 3C:
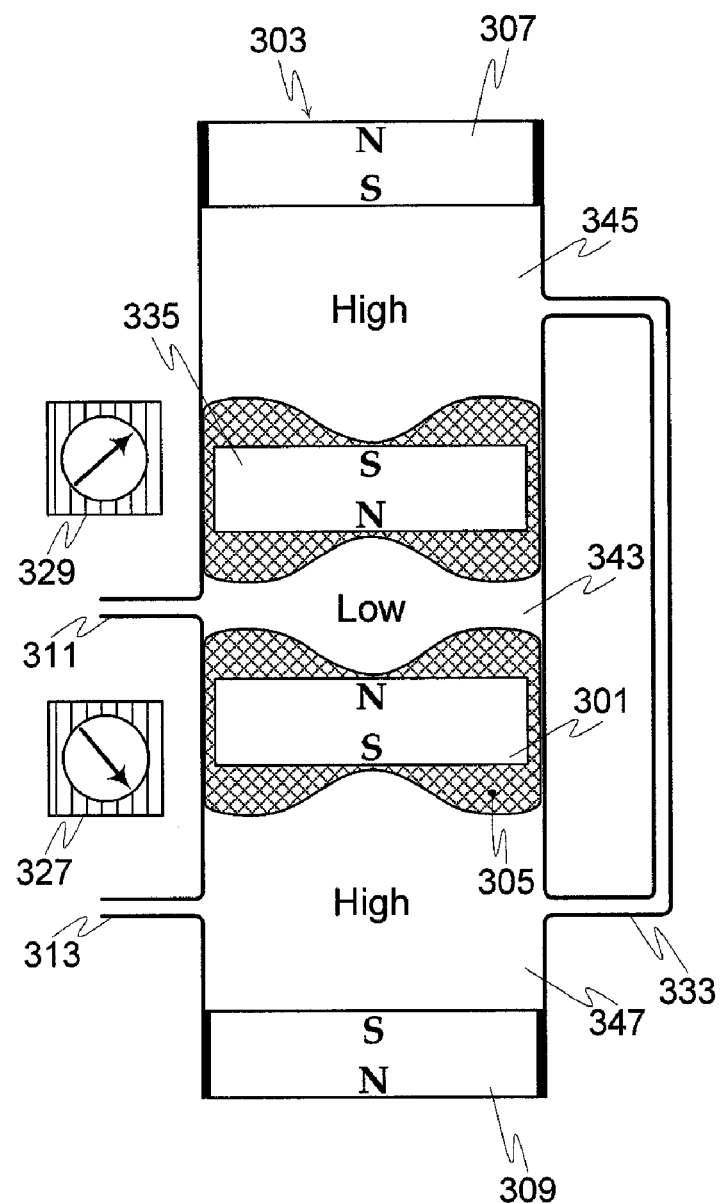

FIGS. 3A-C depict a cross-sectional view of a gravity compensated pressure sensor according to various embodiments of the present invention. These embodiments compensate for errors introduced by gravity, acceleration or orientation—that is, errors caused by any of or more of the three factors including gravity, acceleration or orientation acting either singly or in combination. In these embodiments, the effects of gravity, acceleration or orientation on the moving magnet are compensated for providing two moveable piston magnets 301 and 335 suspended between fixed magnets contained in the magnetic endcaps 307 and 309. Note that endcap 309 is oriented with its magnetic south pole facing inward towards pressure chamber 317 and the magnetic south pole of piston 301. A pressure equalization path 333 is also provided to equalize the pressure in chambers 339 and 341. In this way the pressure between each of the two moveable piston magnets 301 and 335 and their respective adjacent magnetic endcap 309 or 307 is equalized. In other words, the top and bottom cavities 317 and 331 of FIG. 3A are linked, and thus at the same pressure. Similarly, cavities 339 and 341 of FIG. 3B are linked, as are cavities 345 and 347 of FIG. 3C.

In the embodiments of FIGS. 3A-C the effects of gravity, acceleration and orientation can be compensated for by adding 180 degrees to the upper magnetic field angle sensor 329, reversing the sign (i.e., multiplying by negative one), and taking the average of the two readings. Turning to FIG. 3B, magnetic field angle sensor 329 reads minus 45 degrees and magnetic field angle sensor 327 reads 225 degrees. The reading of sensor 329 is adjusted by adding 180 degrees (−45+180=135 degrees). Reversing the sign gives −135 degrees, which equals 225 degrees. For FIG. 3A, sensor 329 reads 0 degrees and sensor 327 reads 180 degrees. Sensor 329 is adjusted by adding 180 degrees (0+180=180 degrees). Reversing the sign gives −180 degrees, which equals +180 degrees.

The explanation of the paragraph above uses the ideal readings taken from the figures, and so averaging the adjusted values would not result in any further accuracy (e.g., 225=225 degrees; and 180=180 degrees). In practice, however, the effect of gravity or acceleration could produce slight inconsistencies in the readings, which would be eliminated by averaging the adjusted values. Turning to FIG. 3B again, the magnetic field angle sensor 329 could read minus 46 degrees and magnetic field angle sensor 327 could be in error by the same factor, reading 224 degrees. The reading of sensor 329 is adjusted by adding 180 degrees (−46+180=134 degrees). Reversing the sign gives −134 degrees, which equals 226 degrees. Taking the average of the two sensor readings would yield (226+224)/2=225.

The various embodiments have been described in terms of magnets of the same polarity facing each other. This is depicted in FIG. 1 where a south pole of encap 107 faces a south magnetic pole of the piston 101 and a north pole of endcap 109 facing the north magnetic pole of piston 101. In this way the like poles push away from each other. Some embodiments, however, are configured so that differing poles face each other—that is, a south pole encap faces a north magnetic pole of the piston and a north pole endcap faces a south magnetic pole of the piston. In this way the opposite poles attract each other rather than pushing away from each other.

Figure 4:
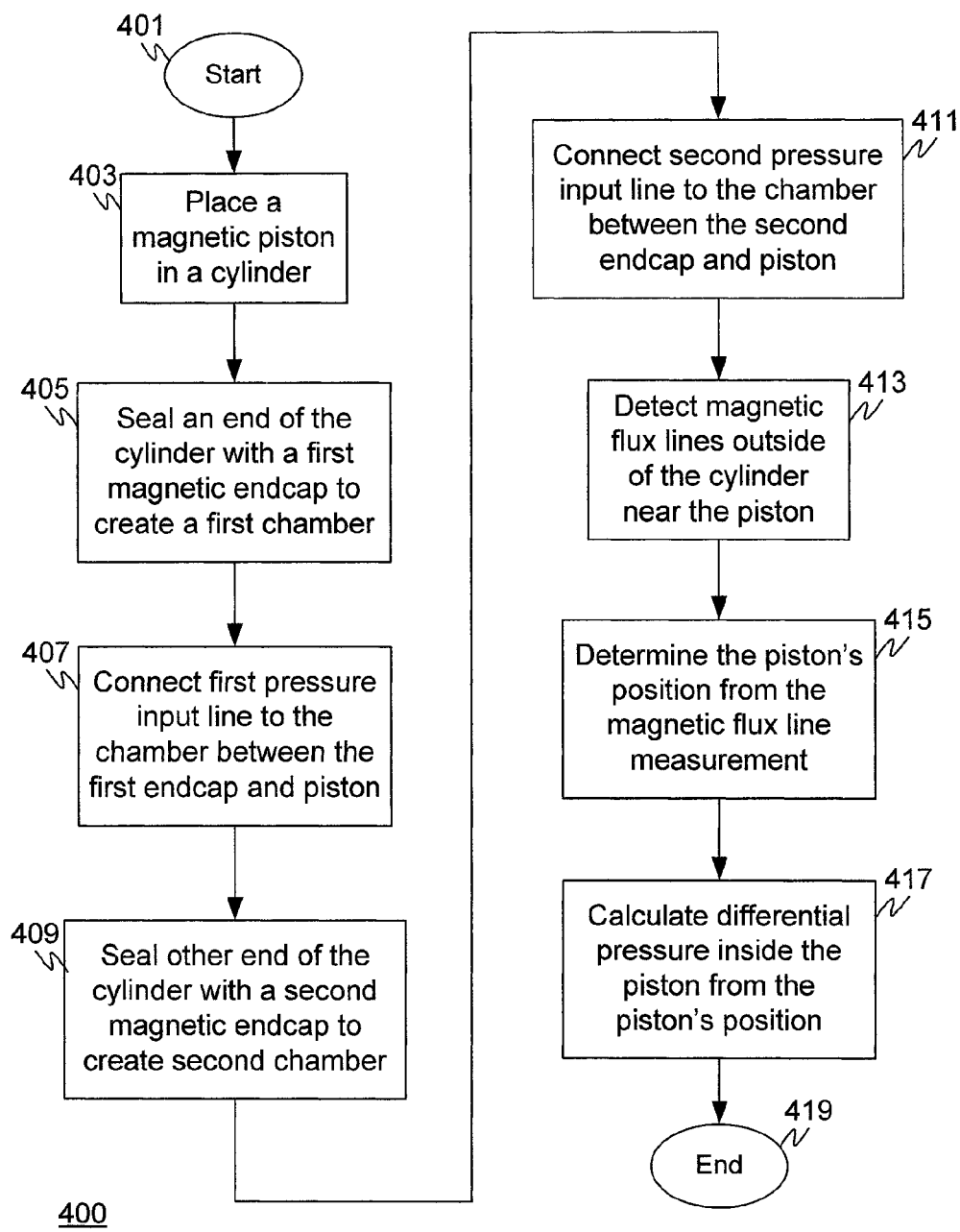
FIG. 4 depicts a flowchart of activities for practicing various methods in accordance with the embodiments disclosed herein.

FIG. 4 depicts a flowchart of activities for practicing various methods in accordance with the embodiments disclosed herein. Many of the activities have been described in further detail above, in conjunction with FIGS. 1-3. The method begins at block 401 and proceeds to 403 where a magnetic piston is fitted within a cylinder. Typically, the outer surface of the magnetic piston closest to the walls of the cylinder is coated with a ferrofluid material that helps provide a seal between the piston and the cylinder wall. In block 405 of FIG. 4 one open end of the cylinder is sealed with a first magnetic endcap, creating a first chamber between the piston and the first endcap. The first magnetic endcap is oriented so that it has a south magnetic pole facing the first chamber of the cylinder. The piston also has a south magnetic pole facing the first chamber of the cylinder.

The method proceeds to 407 for connection of a first pressure line to the first chamber. In block 409 the other end of the cylinder is sealed with a second magnetic endcap, forming a second chamber between the piston and the second magnetic endcap. The second magnetic endcap is oriented so that it has a north magnetic pole facing the second chamber of the cylinder. The north pole of the piston also faces the second chamber. In block 411 a second pressure line is connected to the second chamber.

Proceeding to block 413, a magnetic flux angle detector positioned outside the chamber adjacent the piston detects the flux lines from the piston. In this way, by detecting the piston's magnetic flux lines, the position of the piston can be determined in block 415. Once the position of the piston is known the differential pressure between the two cylinders can be calculated in block 417.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining," as used herein and in the claims, may mean either retrieving from a computer readable storage medium, receiving from another computer program, receiving from a user, calculating based on other input, or any other means of obtaining a datum or set of data. The term "plurality," as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not be included in the "plurality" and are not, therefore, referred to by "each."

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

The invention claimed is:
1. A differential pressure sensor comprising:
   a cylinder with a first end and a second end;
   a first magnetic endcap configured to seal said first end of the cylinder, said first magnetic endcap comprising a south magnetic pole facing a first chamber of the cylinder;
   a piston disposed within the cylinder and configured to have a magnetic pole facing said first chamber;
   a first pressure line input to said first chamber of the cylinder; and
   a sensor positioned outside of said cylinder and configured to detect magnetic flux lines associated with said piston.

2. The differential pressure sensor of claim 1, wherein said magnetic pole is a south magnetic pole, and said sensor is a magnetic flux angle sensor, and further comprising:
   a controller connected to said sensor for receiving data associated with magnetic flux lines and configured to determine a pressure reading.

3. The differential pressure sensor of claim 2, further comprising:
   a magnetic ferrofluid disposed upon said piston to provide a seal between the piston and said cylinder.

4. The differential pressure sensor of claim 3, wherein the controller uses the reading of the magnetic flux angle sensor to determine a position of the piston for use in developing the pressure reading.

5. The differential pressure sensor of claim 4, further comprising:
   a second magnetic endcap configured to seal said second end of the cylinder, said second magnetic endcap comprising a north magnetic pole facing a second chamber of the cylinder.

6. The differential pressure sensor of claim 5, wherein said piston is configured to have a north magnetic pole facing said second chamber; and
   wherein said magnetic flux angle sensor detects the magnetic flux lines between the north magnetic pole of the piston and the south magnetic pole of the piston.

7. The differential pressure sensor of claim 6, further comprising:
   a second pressure line input to said second chamber of the cylinder;
   wherein said pressure reading is a differential pressure reading between a first pressure in said first chamber and a second pressure in said second chamber.

8. The differential pressure sensor of claim 3, wherein the magnetic ferrofluid is magnetically attracted to said piston; and
   wherein the seal between the piston and the cylinder is a gas-tight seal.

9. A differential pressure sensor comprising:
   a hollow cylinder with a first end and a second end;
   a first magnetic endcap configured to seal said first end of the cylinder, said first magnetic endcap comprising a magnetic pole of a first orientation facing a first chamber of the cylinder;
   a first piston disposed within the cylinder and configured to have a magnetic pole of the first orientation facing said first chamber;
   a first pressure line input to said first chamber of the cylinder;
   a second piston disposed within the cylinder to form a second chamber between the first piston and the second piston, said second piston configured to have a magnetic pole of a second orientation facing said second chamber;
   a second pressure line input to said second chamber of the cylinder;
   a second magnetic endcap configured to seal said second end of the cylinder, said second magnetic endcap comprising a magnetic pole of the second orientation facing a third chamber of the cylinder formed between the second piston and the second magnetic endcap;
   a pressure line connector between the first chamber and a third chamber formed between the second piston and the second magnetic endcap;
   a first magnetic flux angle sensor positioned outside said cylinder to detect first magnetic flux lines from the first piston; and
   calculating means for using a first reading of the first magnetic flux angle sensor to develop a pressure reading.

10. The differential pressure sensor of claim 9, wherein said first piston has a first magnetic ferrofluid seal between the first piston and said cylinder, and said second piston has a second magnetic ferrofluid seal between the second piston and said cylinder.

11. The differential pressure sensor of claim 10, wherein the first magnetic ferrofluid seal is magnetically attracted to said first piston and the second magnetic ferrofluid seal is magnetically attracted to said second piston; and
    wherein the first magnetic ferrofluid seal and the second magnetic ferrofluid seal are both gas-tight seals.

12. The differential pressure sensor of claim 9, wherein the pressure reading is a differential pressure reading, the differential pressure sensor further comprising:
    a second magnetic flux angle sensor positioned outside said cylinder to detect second magnetic flux lines from the second piston;
    wherein said calculating means uses the first reading of the first magnetic flux angle sensor and a second reading of the second magnetic flux angle sensor to develop the differential pressure reading.

13. The differential pressure sensor of claim 12, wherein said differential pressure reading is a difference between a first pressure in said first chamber and a second pressure in said second chamber.

14. The differential pressure sensor of claim 12, wherein the second reading of the second magnetic flux angle sensor is used to compensate for errors caused by gravity, acceleration or orientation.

15. The differential pressure sensor of claim 12, wherein the second reading is added to 180 degrees to obtain a sum, and the sum is negated to obtain an adjusted second reading to compensate for said errors caused by gravity, acceleration or orientation.

16. The differential pressure sensor of claim 12,
    wherein the calculating means uses the first reading of the first magnetic flux angle sensor to determine a first position of the first piston; and
    wherein the calculating means uses the second reading of the second magnetic flux angle sensor to determine a second position of the second piston.

17. The differential pressure sensor of claim 9, wherein the magnetic pole of the first orientation is a north magnetic pole and the magnetic pole of the second orientation is a south magnetic pole.

18. The differential pressure sensor of claim 17,
    wherein said first magnetic flux angle sensor detects the first magnetic flux lines between the north magnetic pole of the first piston and a south magnetic pole of the first piston; and wherein said second magnetic flux angle sensor detects the second magnetic flux lines between a north magnetic pole of the second piston and the south magnetic pole of the second piston.

19. A method of sensing pressure in a cylinder, the method comprising:

forming a chamber in the cylinder between a magnetic endcap configured to seal the cylinder and a piston disposed within the cylinder, said magnetic endcap comprising a south magnetic pole facing into the chamber, and said piston also comprising a south magnetic pole facing the chamber;

receiving a liquid under pressure into said chamber via a pressure line input to said chamber; and detecting, outside of said cylinder, magnetic flux lines associated with said piston to determine a position of the piston; and determining a pressure reading based on the position of the piston.

20. The method of claim 19, wherein the chamber is a first chamber, the liquid is a first liquid, the pressure line input is a first pressure line input, and the magnetic endcap is a first magnetic endcap configured to seal a first end of the cylinder, the method comprising:

forming a second chamber in the cylinder between a second magnetic endcap configured to seal a second end of the cylinder and the piston, said second magnetic endcap comprising a north magnetic pole facing into the second chamber, and said piston also comprising a north magnetic pole facing the second chamber; and receiving a second liquid under pressure into said second chamber via a second pressure line input to said second chamber;

wherein said pressure reading is a differential pressure based on the position of the piston.

* * * * *